UNITED STATES PATENT OFFICE.

R. PRINCE AND A. LOVIS, OF BOSTON, MASSACHUSETTS.

IMPROVEMENT IN PROCESSES FOR CALICO-PRINTING.

Specification forming part of Letters Patent No. 13,915, dated December 11, 1855.

*To all whom it may concern:*

Be it known that we, ROBERT PRINCE, of Lowell, county of Middlesex, and State of Massachusetts, and AMBROSE LOVIS, of Boston, county of Suffolk, and State of Massachusetts, have jointly invented an improvement in the composition of the salts used in the dunging operation in printing mordanted goods; and we do hereby declare that the following is a full and exact description thereof.

The nature of our invention and improvement relates to the manufacture of a compound of silicate of soda, or silicate of potash, with neutral salts, and the subsequent employment of such a compound, either with or without alkaline and neutral salts, as a substitute for dung in the operation known to calico-printers as that of "dunging." It is well known that phosphates and arseniates of soda and potash have been long used as a substitute, and that repeated attempts have been made to use, instead of these, silicates of the alkalies or earths. Some success has attended the use of both silicate of soda and silicate of lime with small additions of carbonate of soda; but the operations of these agents have been uncertain, the mordant being sometimes removed, at other times left, so as to interfere seriously with continuous manufacture. Now, our experiments, conducted on a large scale, have shown the causes of these uncertain actions, and we have found that the presence of neutral and alkaline salts in large proportion is essential to successful use of silicates of the alkalies; and our improvement consists in making the silicate of soda or potash in presence of neutral salts. We also add to the solution of the compound silicate, neutral or alkaline salts, so that a specific and desirable effect may be produced.

We find that the compound of silicate and neutral salts applies to the generality of colors or dyes, but for delicate pink shades we prefer to use a mixture of silicate with arseniate of the alkalies.

To enable those skilled in the art to manufacture and use our improved compound, we proceed to describe our process.

Into a reverberatory furnace which has a strong draft, and which has been previously heated to a white heat for the purpose of glazing the fire-bricks of which it is built, we introduce an even mixture of two hundred and twenty pounds of carbonate of soda or pure soda-ash, forty pounds of common salt, forty-one pounds of sulphate of soda, and two hundred and eighty pounds of white sand in small portions relatively to the size of the furnace-bed. Instead of mixing these materials with pure carbonate of soda, we use a prepared soda-ash found in the market, which contains about seventy-five parts of carbonate of soda and twenty-five parts of a mixture of common salt and sulphate of soda, but is free from lime or iron oxide. These materials are quickly fluxed to a stiff transparent glass, and rapidly withdrawn and cooled. The parcels thus made are subsequently ground to a coarse powder, which is composed of silicate of soda, chloride of sodium, and sulphate of soda, with traces of sulphuret of iron. These proportions of salts we find most easily fluxed; but we do not confine ourselves to these constantly, a variation of several per cent. of either being allowed.

In making use of our salt in the operations of dunging, we form a standard solution containing one pound of the silicate in one gallon of the solution by boiling the powdered salt in clean water and adding hot water as the boiling continues. To the hot solution we add one pound to each gallon of a prepared mixture of carbonate of soda, containing about twenty-five per cent. of common salt and sulphate of soda, and dissolve by agitation, it being necessary that the silicate compound should be first dissolved before the other salts are added. This solution we call a "standard solution." The goods to be treated may be "aged" as preferred. Twelve gallons of the standard solution may be added to a fly-dung cistern containing from six hundred to seven hundred gallons of water, already heated to about 190° Fahrenheit by steam, and when twenty pieces of ordinary calico have been run an addition of one gallon to each twenty pieces succeeding must be made until three hundred or four hundred pieces have passed. It is then best to empty and refill the cistern, reheating as above. In the second dunging by cistern and winch, the water being at 150° Fahrenheit, one gallon of the standard solution is sufficient for one hundred and fifty gallons of water, and the goods, after washing with water, are ready for dyeing. When goods mordanted as usual are submitted to this treatment it will be observed that the dye is very heavy from the perfect manner in which the mordant is preserved in union with the cloth. Mordants may be much reduced in strength and still the usual depth of color will be obtained.

Where delicate shades of pink are mordanted, unless the mordant is slightly acid, the alkaline energy of the compound solution removes the mordant; and where purples over citric acid are mordanted it is necessary to use an additional acid strength to counteract the alkaline tendency.

More effectually to guard from "stripping," we prefer to use our compound of silicate and arseniate of soda or potash for pinks and purples, the standard solution of which may be formed by using one gallon of the silicate solution containing one pound of the powdered silicate, and dissolving in it one pound of arseniate of soda, instead of neutral and alkaline salts, above stated.

It has been found that the improvement here described renders useless the consumption of dung, phosphates, and arseniates, while a large saving in the quantity of mordants and in celerity and certainty of the operations is effected.

We are aware that pure silicate of soda alone, or with pure carbonate of soda, has been used heretofore in dunging, and we are also aware that silicate of lime has been used for the same purposes. We disclaim the use of these substances, confining ourselves to the use of the silicate in mixture with neutral and alkaline salts.

What we claim as our invention, and desire to secure by Letters Patent, is—

The manufacture of silicates of soda or potash containing foreign neutral salts, and the use of this compound with carbonate of soda and neutral salts in dunging operations, substantially as set forth.

ROBERT PRINCE.
AMBROSE LOVIS.